United States Patent
Gotou et al.

(10) Patent No.: US 9,299,479 B2
(45) Date of Patent: Mar. 29, 2016

(54) WIRE HARNESS

(71) Applicant: Yazaki Corporation, Minato-ku, Tokyo (JP)

(72) Inventors: Hiroki Gotou, Kosai (JP); Kenichirou Kawaguchi, Susono (JP); Mitsunori Tsunoda, Toyota (JP)

(73) Assignee: Yazaki Corporation, Minato-ku, Tokyo (JP)

(*) Notice: Subject to any disclaimer, the term of this patent is extended or adjusted under 35 U.S.C. 154(b) by 66 days.

(21) Appl. No.: 13/940,903

(22) Filed: Jul. 12, 2013

(65) Prior Publication Data

US 2013/0292159 A1 Nov. 7, 2013

Related U.S. Application Data

(63) Continuation of application No. PCT/JP2011/079472, filed on Dec. 20, 2011.

(30) Foreign Application Priority Data

Jan. 13, 2011 (JP) ................................ 2011-005053
Jul. 19, 2011 (JP) ................................ 2011-158286

(51) Int. Cl.
*H01B 7/00* (2006.01)
*H02G 3/04* (2006.01)
*H02G 3/30* (2006.01)
*B60R 16/02* (2006.01)
*F16B 5/06* (2006.01)
(Continued)

(52) U.S. Cl.
CPC .......... *H01B 7/0045* (2013.01); *B60R 16/0215* (2013.01); *H02G 3/0487* (2013.01); *H02G 3/305* (2013.01); *F16B 5/0642* (2013.01); *F16B 11/006* (2013.01); *F16B 21/086* (2013.01)

(58) Field of Classification Search
USPC ........................................................ 174/72 A
See application file for complete search history.

(56) References Cited

U.S. PATENT DOCUMENTS 2,931,851 A * 4/1960 Sims .................... B60R 16/0215
174/40 CC
4,918,261 A * 4/1990 Takahashi ................. F16L 3/23
174/135

(Continued)

FOREIGN PATENT DOCUMENTS

CN 101840750 A 9/2010
JP 3001262 8/1994

(Continued)

OTHER PUBLICATIONS

International Search Report issued in corresponding International Application No. PCT/JP2011/079472 mailed Feb. 21, 2012.

(Continued)

*Primary Examiner* — Timothy Thompson
*Assistant Examiner* — Krystal Robinson
(74) *Attorney, Agent, or Firm* — Banner & Witcoff, Ltd.

(57) ABSTRACT

There is provided a wire harness. The wire harness is wired in a predetermined wiring pattern with respect to an attached body. The wire harness is packaged by being held by a one-sided adhesive sheet so that the wiring pattern is kept. The one-sided adhesive sheet is formed into an external shape that fits a wiring course shape of the wire harness with respect to the attached body.

13 Claims, 19 Drawing Sheets

(51) Int. Cl.
  *F16B 11/00* (2006.01)
  *F16B 21/08* (2006.01)

(56) References Cited

U.S. PATENT DOCUMENTS

| | | | |
|---|---|---|---|
| 5,895,889 A | | 4/1999 | Uchida et al. |
| 5,918,365 A | * | 7/1999 | Uchida ............... B60R 16/0207 174/72 A |
| 7,435,904 B2 | * | 10/2008 | Peterson ................. H02G 3/00 174/135 |
| 2007/0264124 A1 | * | 11/2007 | Mueller et al. ................ 416/230 |
| 2010/0236827 A1 | | 9/2010 | Doi et al. |

FOREIGN PATENT DOCUMENTS

| | | | |
|---|---|---|---|
| JP | 08203350 A | * | 8/1996 |
| JP | 09-035539 | | 2/1997 |
| JP | 11-248039 | | 9/1999 |
| JP | 2003-143731 A | | 5/2003 |
| JP | 2003143731 A | * | 5/2003 |
| JP | 2004-357415 A | | 12/2004 |

OTHER PUBLICATIONS

English translation of Written Opinion of the International Searching Authority for corresponding International Application No. PCT/JP2011/079472 mailed Feb. 21, 2012.

Jun. 30, 2015—(CN) Notification of the First Office Action—App 2011/0064807.6.

Sep. 29, 2015—(JP) Notification of Reasons for Refusal—App 2011-158286.

Dec. 17, 2015—(CN) Notification of the Second Office Action—App 201180064807.6.

\* cited by examiner

WIRE HARNESS

CROSS REFERENCE TO RELATED APPLICATIONS

This application is a continuation of PCT application No. PCT/JP11/079472, which was filed on Dec. 20, 2011 based on Japanese Patent Application (No. 2011-005053) filed on Jan. 13, 2011 and Japanese Patent Application (No. 2011-158286) filed on Jul. 19, 2011, the contents of which are incorporated herein by reference.

BACKGROUND

The present invention relates to a wire harness.

A wire harness, which is attached to the body or a door of a vehicle which is an attached body, is formed into a predetermined wiring pattern along harness wiring courses when a plurality of electric wires are mutually wired on a wiring board, end parts of the electric wires are attached to a connector, a protector is attached to a branched portion, a protecting member for protection (such as sponge) is attached and a tape winding is performed. A plurality of clamps attached to the wire harness are attached by being locked to clamp mounting holes bored at the body or the door.

For example, as shown in FIG. 15, a wire harness 503 which is attached to a door 501 is fixed by a plurality of clamps 505. In the wire harness 503, as shown in FIG. 16, connectors 509 are attached to an end part 507c of bound electric wires 507a or end parts 507d of branched portions 507b, soundproofing tapes 511 for preventing the occurrence of hitting sound are wound to predetermined portions as necessary, and a protector 513 is attached.

The clamps 505 are individually fixed to the wire harness 503 with tapes 515 one by one (for example, refer to a patent document 1). As shown in FIG. 17, in the clamp 505, a shaft 519 is raised from a board part 517, locking wing parts 521 are projected to two sides from the distal end of the shaft 519, and two sides of the board part 517 which holds the shaft 519 are wound and fixed to the wire harness 503 by tapes 515. The wire harness 503 can be attached to an attached body 525 when the clamps 505 are attached at a predetermined clamp pitch P1 in accordance with clamp holes 527 bored on the attached body 503.

[Patent document 1] Japan Patent Publication No. 11-248039 (FIG. 5)

[Patent document 2] Japan Patent Publication No. 2004-357415

SUMMARY

However, because only the tape winding is performed on the above-mentioned wire harness 503 to bundle up the plurality of electric wires 507a, the wire harness 503 itself cannot be kept in the predetermined wiring pattern. Thus, at the time of attaching to the vehicle, it is necessary to attach the wire harness 503 along a harness wiring course while the clamps 505 or attaching reference parts such as branched portions of the electric wires are aligned with a plurality of fixing sites of the attached body 525, and the attaching operativity is not preferable.

As disclosed in the patent document 2, by using a protector made of resin formed into the predetermined wiring pattern, it is possible to keep the wiring pattern of the wire harness. However, because the protector becomes an exclusive article for a particular wire harness or fixing sites, it is necessary to provide a new protector whose wiring pattern is different whenever the harness wiring course is changed, and there is a problem that it takes expense and time in production.

Because the clamps 505 are individually fixed to the wire harness 503 one by one, the pitch precision with which the clamps are attached may get worse. Thus, because the clamps 505 are attached to the attached body 525 with allowance, it is necessary to set a plus clearance from the clamp hole pitch P2 of the attached body 525. Therefore, at the sites where the clamps are attached at the clamp pitch P1 which is larger than the clamp hole pitch P2, the wire harness 503 becomes slack, and such slackness makes it possible that hitting sound may occur when the vehicle is running.

Because the clamps 505 are individually fixed to the wire harness 503 with the tapes 515 one by one, time is required, and the attaching operativity is bad. In addition, because it is necessary to attach the soundproofing tapes 511 and the protector 513, the number of components increases and the attaching operativity further worsens.

As shown in FIG. 18, when the clamp 505 is attached to the clamp hole 527, the clamp hole 527 may be a part where waterproofing is required. In such a time, as shown FIGS. 19A and 19B, a packing 531 is affixed to a circular plate part 523 of the clamp 505. Therefore, while it takes time and effort to affix the packing 531 on each of the clamps 505, a displacement or a burr may occur to the packing 531. Further, because the sealing surface 533 of the clamp 505 is a linear part 535 at the outer periphery of the circular plate part, the linear part 535 may be damaged and waterproofness may be impaired.

The present invention is made in view of the above-mentioned situations, and the objects of the present invention are to provide a wire harness which can be attached to an attached body in a simple and inexpensive way, and to provide a wire harness so that the pitch precision with which the clamps are attached to the wire harness can be improved and the man hours taken to assemble the wire harness can be reduced.

The above objects according to the present invention are accomplished by the following constructions.

(1) There is provided a wire harness, wherein the wire harness which is wired in a predetermined wiring pattern with respect to an attached body is packaged by being held by a one-sided adhesive sheet so that the wiring pattern is kept.

According to the wire harness of the above (1), only by packaging the wire harness that is wired in the predetermined wiring pattern with the one-sided adhesive sheets to hold the wire harness, the wiring pattern such as bent portions, branched portions or straight portions of electric wires is kept. Thus, the wire harness can be attached easily in accordance with the wiring courses of the attached body. When the wire harness is packaged with the one-sided adhesive sheets, a plurality of components (binding tapes, soundproofing sheets, clamp attaching tapes, etc.) attached under the present conditions are integrated, and assembling operations on jigs are largely reduced.

(2) There is provided the wire harness according to the above (1), wherein the one-sided adhesive sheet is formed into an external shape that fits a wiring course shape of the wire harness with respect to the attached body.

According to the wire harness of the above (2), by molding the external shape of the one-sided adhesive sheets to fit the wiring course shape of the wire harness, attaching reference parts of the wire harness such as bent portions or branched portions of electric wires and positions where clamps are attached can be recognized from the appearance that is covered with the one-sided adhesive sheets. Thus, it becomes easy to position the attaching reference parts of the wire harness relative to fixing sites in the wiring course of the wire harness in the attached body when the harness is attached, and the attaching operativity is further improved. By reducing the extra parts of the one-sided adhesive sheets, while the wire harness becomes lightweight, the wiring space can be compact.

(3) There is provided the wire harness according to the above (2), wherein the one-sided adhesive sheet includes a portion having an external shape that corresponds to at least any two portions of bent portions and branched portions of an electric wire, and the bent portions and the branched portions are spaced with a predetermined distance in accordance with positions where the attached body is attached.

According to the wire harness of the above (3), because the external shape, which corresponds to the bent portions or branched portions of the electric wires that become the attaching reference parts of the wire harness relative to a plurality of fixing sites of the attached body when the harness is attached, is formed at the one-sided adhesive sheets in advance by a forging process or the like, a high interval precision between the attaching reference parts is obtained.

(4) There is provided the wire harness according to the above (2), wherein the one-sided adhesive sheet holds a clamp in a sheet hole which is formed with a predetermined distance from bent portions or branched portions of an electric wire in accordance with positions where the attached body is attached.

According to the wire harness of the above (4), because the external shape, which corresponds to the bent portions or the branched portions of the electric wires that become the attaching reference parts relative to a plurality of fixing sites of the attached body when the harness is attached, and the sheet holes for holding the clamps are formed at the one-sided adhesive sheets in advance by a forging process or the like, a high interval precision between these attaching reference parts is obtained.

(5) There is provided the wire harness according to the above (1) or (2), wherein the one-sided adhesive sheet holds clamps in a plurality of sheet holes which are formed at a predetermined pitch in accordance with positions where the attached body is attached.

According to the wire harness of the above (5), because the sheet holes for holding the clamps are opened at the one-sided adhesive sheets in advance by a forging process or the like, in comparison that the clamps are attached by hands at present, a high pitch precision is obtained.

(6) There is provided the wire harness according to the above (4) or (5), wherein a surface material at a side opposite to an adhesive surface of the one-sided adhesive sheet has waterproofness.

According to the wire harness of the above (6), because the one-sided adhesive sheets also function as packings, it is not necessary to attach a packing to each of the clamps. Because the packing provided to the individual clamp is integrated with the one-sided adhesive sheets, the waterproofing sealing surface is increased, the displacement, roll or deformation of the packings is not occurred, and the waterproofness is improved.

(7) There is provided the wire harness according to any one of the above (4) to (6), wherein a position of the sheet hole which is formed in the one-sided adhesive sheet and through which the clamp is inserted is offset from the position where the wire harness is wired.

According to the wire harness of the above (7), because the clamps are offset from the positions where the wire harness is wired, the height of the clamps and the height of the wire harness are not accumulated, and the attaching height of the wire harness from the attached body is kept low.

(8) There is provided the wire harness according to the above (7), wherein the clamp has a shaft which is inserted through the sheet hole, and a diameter of the shaft is smaller than a diameter of the sheet hole.

According to the wire harness of the above (8), because it is possible for the clamp to move relative to the sheet hole, a fine adjustment of the clamp pitch is possible.

(9) There is provided the wire harness according to any one of the above (4) to (8), wherein the clamp is formed with a sealing surface pressure generating part which makes the one-sided adhesive sheet come into close contact with the attached body when the clamp is attached to the attached body.

According to the wire harness of the above (9), when the clamp is attached to the attached body, the sealing surface pressure generating part of the clamp presses the one-sided adhesive sheet against the attached body, the contact surface with the attached body gets large, the sealing surface is stable, and reliable waterproofness is ensured.

(10) There is provided the wire harness according to any one of the above (1) to (9), wherein the one-sided adhesive sheet is a self-adhesive sheet which can be bonded only by contacting adhesive surfaces thereof with each other.

DETAILED DESCRIPTION OF EXEMPLIFIED EMBODIMENTS

Below, the embodiments of the invention are explained with reference to the figures.

Figure 1:
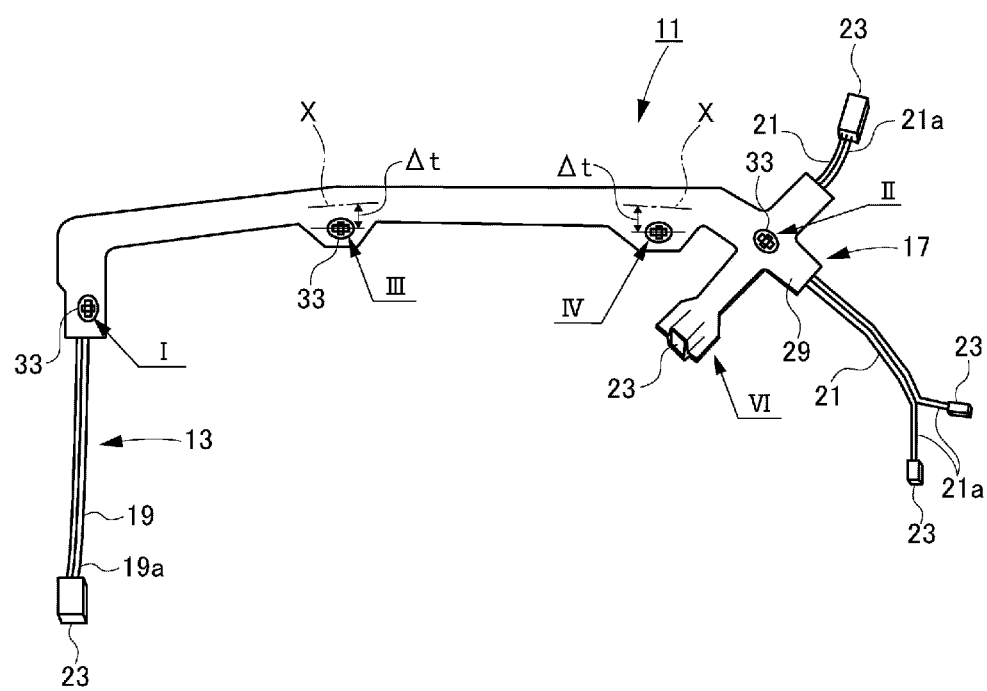
FIG. 1 is a top view of a clamp-attached wire harness according to a first embodiment of the present invention.

FIG. 1 is a top view of the clamp-attached wire harness according to the first embodiment of the present invention.

Figure 15:
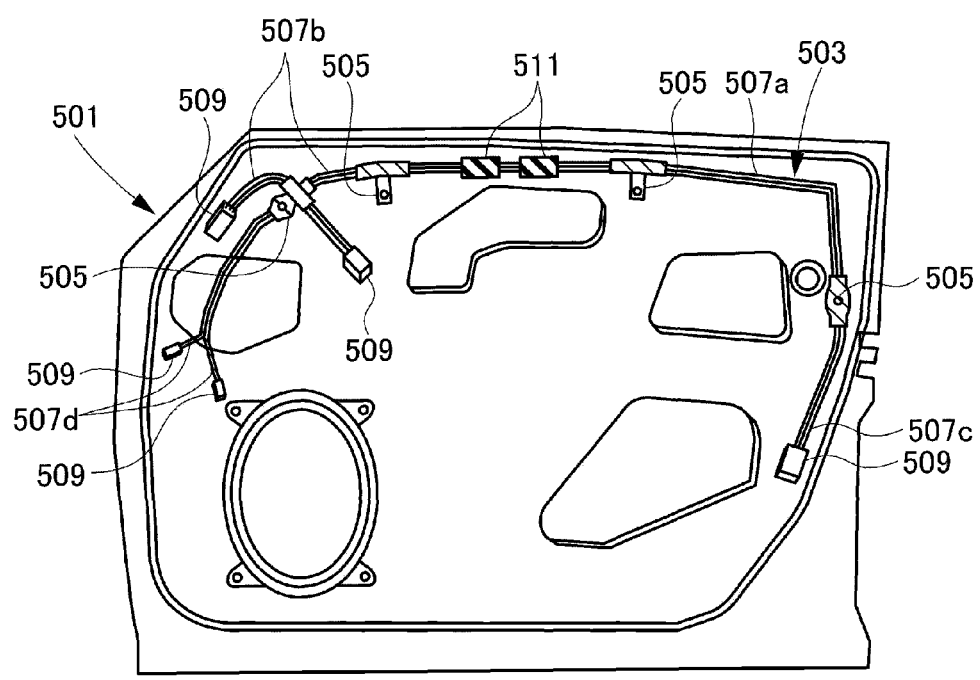
FIG. 15 is a front view of a door to which a wire harness is attached by traditional clamps.
Figure 16:
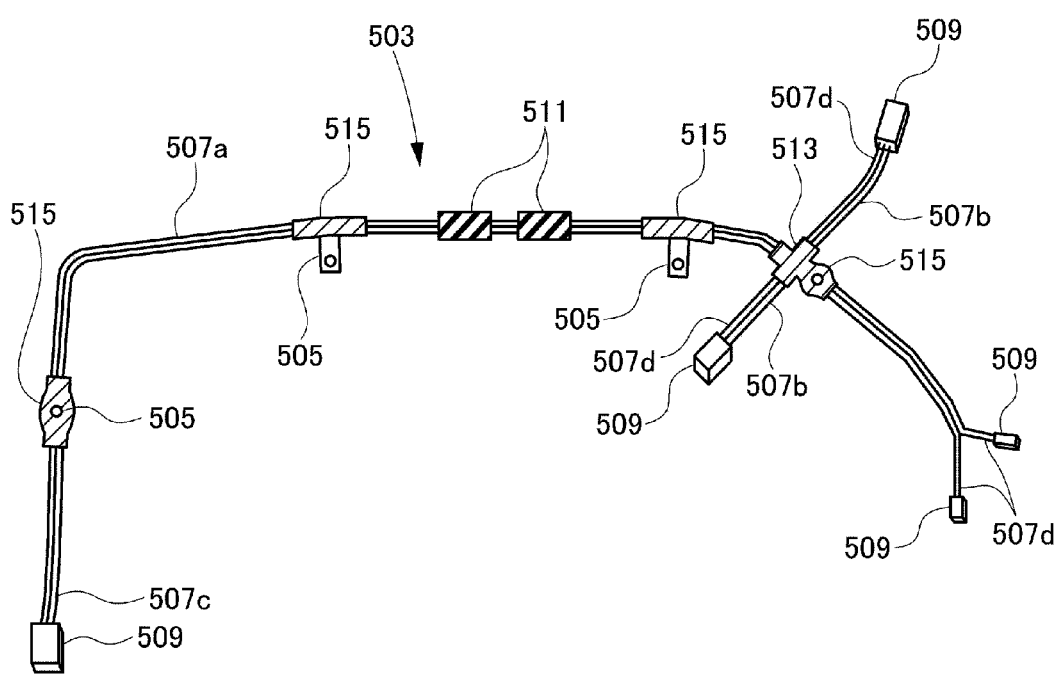
FIG. 16 is a top view of the wire harness shown in FIG. 15.
Figure 17:
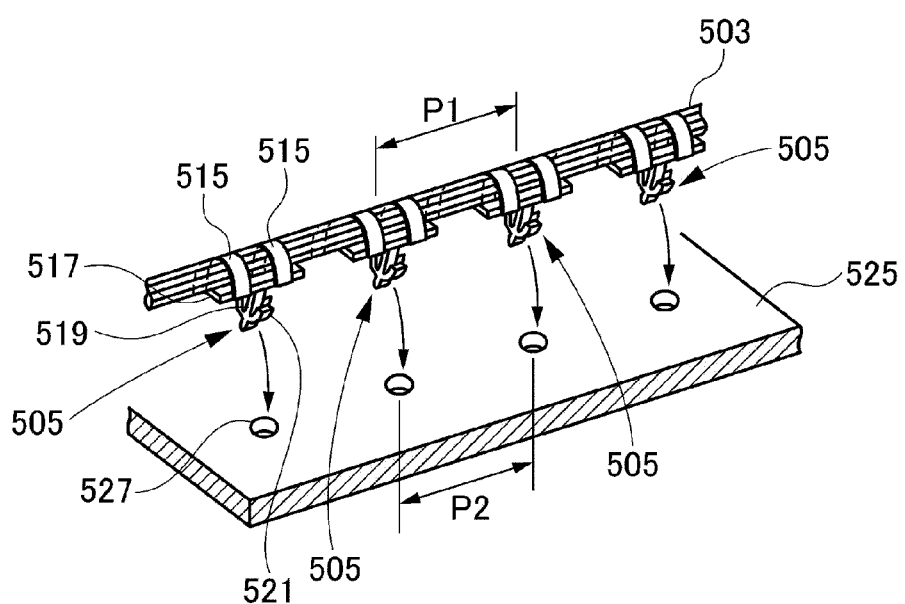
FIG. 17 is a perspective view which represents a positional relationship between clamps and clamp holes.
Figure 18:
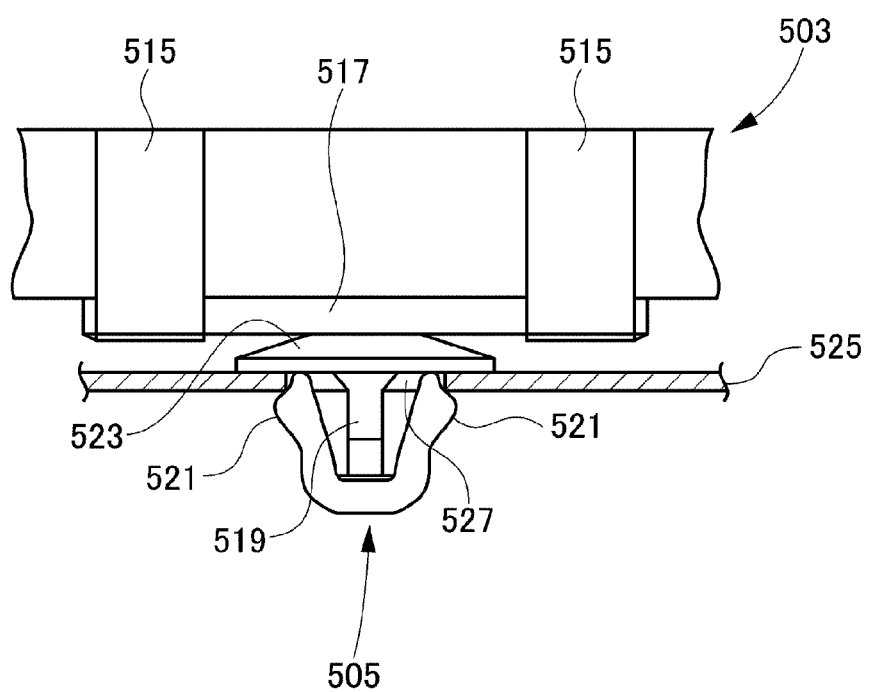
FIG. 18 is a side view of a clamp whose plate part abuts with an attached body.
Figure 19A:
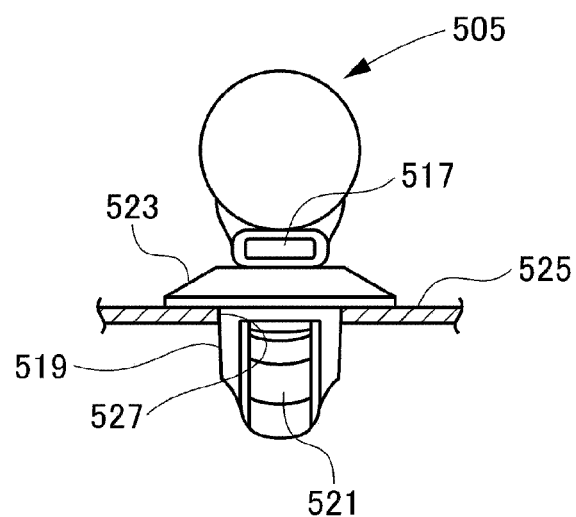
FIG. 19A is a front view of the clamp shown in FIG. 18.
Figure 19B:
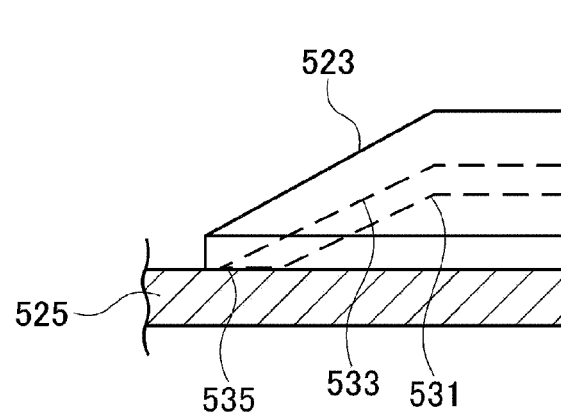
FIG. 19B is an enlarged figure of main parts of the plate part shown in FIG. 19A.

In a clamp-attached wire harness 11, a wire harness 13 which is wired in a predetermined wiring pattern is packaged by being held by one-sided self-adhesive sheets 17. The wire harness 13 includes a plurality of trunk wire parts 19 which are wired in the predetermined wiring pattern in accordance with wiring courses relative to, for example, the door 501 shown in FIG. 15, and branched portions 21 which are branched from the trunk wire parts 19. Connectors 23, which are connected to auxiliaries or the like (not shown in the figure) which are loaded onto the vehicle, are attached to end parts 19a of these trunk wire parts 19 and end parts 21a of the branched portions 21.

Figure 2:
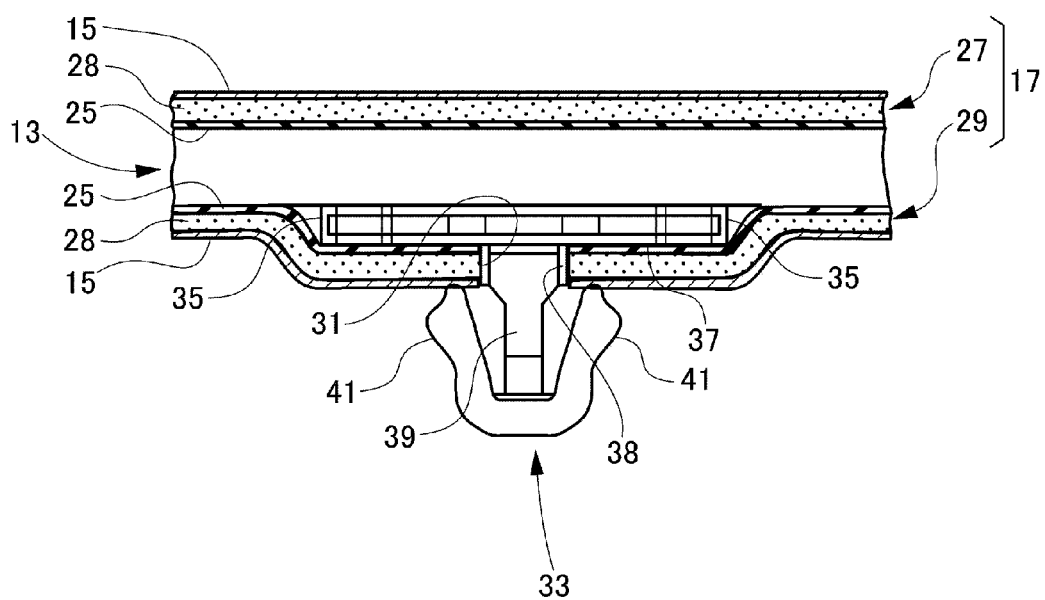
FIG. 2 is a sectional view around a clamp in a direction along the wire harness in the part I shown in FIG. 1.
Figure 3:
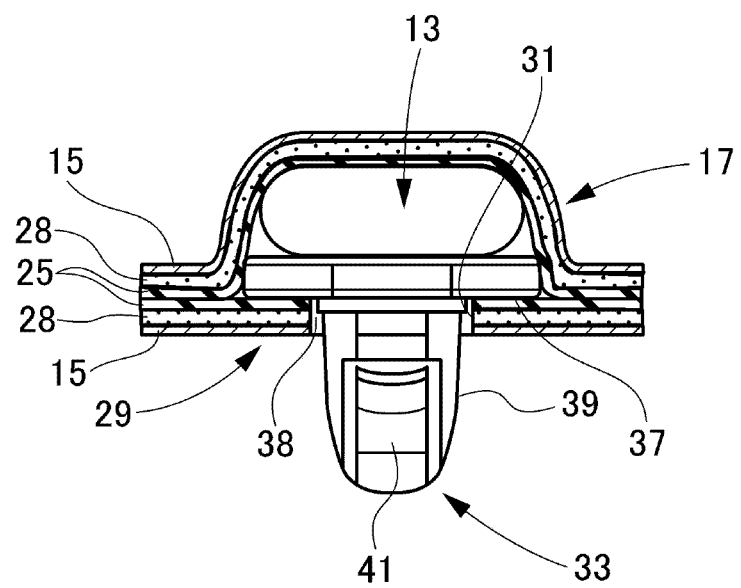
FIG. 3 is a sectional view in a direction perpendicular to that of FIG. 2.

As shown in FIGS. 2 and 3, the one-sided self-adhesive sheets 17, as the one-sided adhesive sheets used in the present embodiment, are self-adhesive sheets which can be bonded to each other only by combining their own adhesive surfaces (inside surfaces). That is, the self-adhesive sheets may be easily bonded by simply combining the adhesive surfaces (inside surfaces) without paste or binding tape. Further, special adhesive layers 25 of the one-sided self-adhesive sheets 17 will not stick to the wire harness 13 or the fingers of an operator, and thus the assembling operativity will not be decreased. In the one-sided self-adhesive sheets 17, a surface material 15 is laminated on the outside surface of a sheet base material 28 made of PP (polypropylene) foams, and the special adhesive layer 25 is laminated on the inside surface. Craft paper, a liner board, a PET (polyethylene terephthalate) film, a PP film, a nonwoven fabric or the like may be used for the surface material 15. The one-sided self-adhesive sheets 17 have properties that the tensile strength in the longitudinal direction is 49N/cm width, and the tensile strength in the transverse direction is 23N/cm width, (conforming to JIS K-6767), the tear strength in the longitudinal direction is 7.8N, and the tear strength in the transverse direction is 6.8N (conforming to JIS K-6767), the water vapor permeability is 0.0052 g/cm$^2$·24 hrs (FS-101B), and the initial adhesion is 2.5N/cm width (T type peel test). For example, Cro-nel (registered trademark) made by Crowell corporation in US can be used as the one-sided self-adhesive sheets 17. Not only the above one-sided self-adhesive sheets 17, but also well-known adhesive sheets in which an adhesive layer is laminated on the inside surface of a sheet base material can be used as the one-sided adhesive sheets of the present invention.

FIG. 2 is a sectional view around a clamp in a direction along the wire harness 13 in the part I shown in FIG. 1. FIG. 3 is a sectional view in a direction perpendicular to that of FIG. 2.

Figure 7:
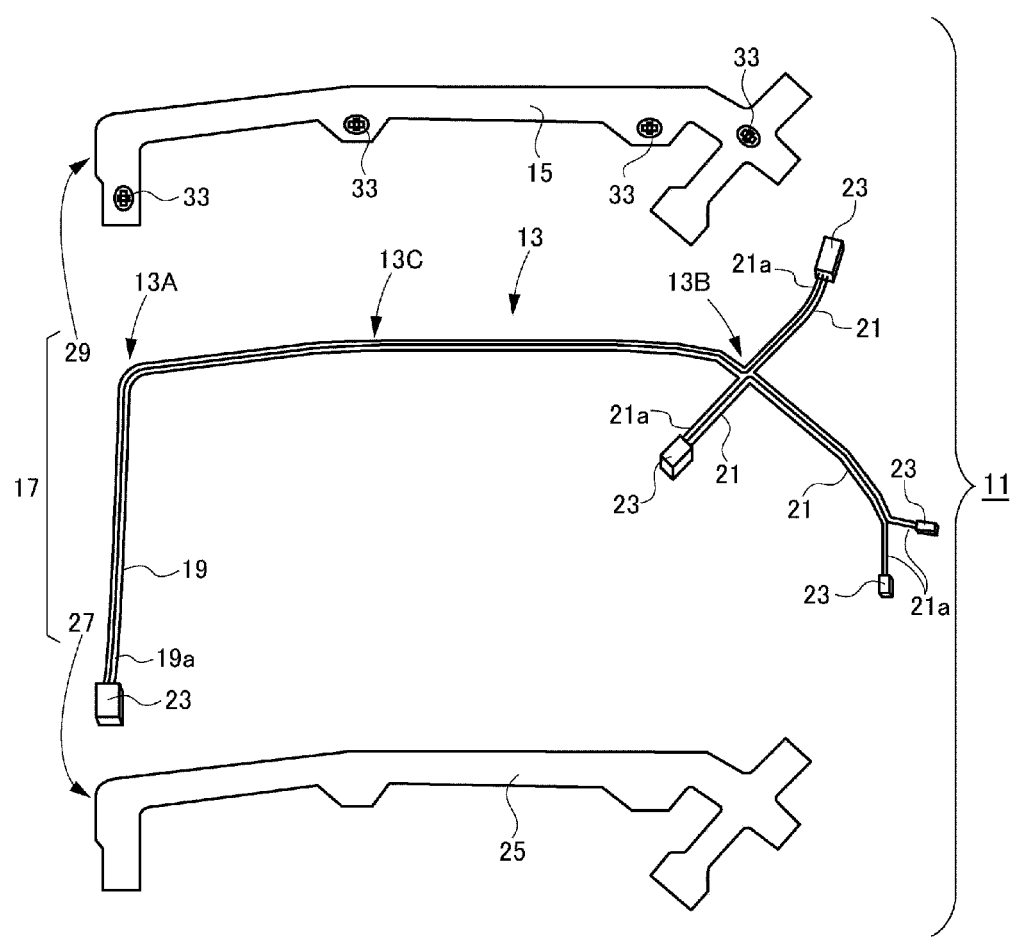
FIG. 7 is an exploded view of the clamp-attached wire harness shown in FIG. 1.

In this embodiment, the one-sided self-adhesive sheets 17 include a first one-sided self-adhesive sheet material 27 and a second one-sided self-adhesive sheet material 29 (refer to FIG. 7). The first one-sided self-adhesive sheet material 27 is a sheet on the inside surface of which the special adhesive layer 25 is laminated, and the external shape of which, except free end parts 19a and 21a near the connectors 23 except the partial VI of FIG. 1, is formed in accordance with the wiring course shape of the wire harness 13 in advance. The second one-sided self-adhesive sheet material 29, like the first one-sided self-adhesive sheet material 27, is a sheet on the inside surface of which the special adhesive layer 25 is laminated, and is formed into such a shape that the adhesive surface (inside surface) matches that of the first one-sided self-adhesive sheet material 27. Sheet holes 31 are bored at predetermined positions of the second one-sided self-adhesive sheet material 29. Clamps 33 are inserted through these sheet holes 31. The second one-sided self-adhesive sheet material 29 after the clamps 33 are inserted through the sheet holes 31 constructs a clamp-sheet assembly.

The shapes of the first one-sided self-adhesive sheet material 27 and the second one-sided self-adhesive sheet material 29 are not limited to the portions such as the trunk wire parts 19 and the branched portions 21, and are formed diversely according to the purpose or application.

As shown in the part VI of FIG. 1, by forming the one-sided self-adhesive sheets 17 into a shape to collectively surround the connector 23 and the end part 21a of the wire harness 13, the connector 23 and the end part 21a are rigidified, and the end part 21a can be protected from contacting with an attached body (for example, a door panel) 43 or the like. Of course, the one-sided self-adhesive sheets 17 can be formed into a roughly rectangular shape to collectively surround all the connectors 23 and the end parts 19a and 21a of the wire harness 13.

Figure 4:
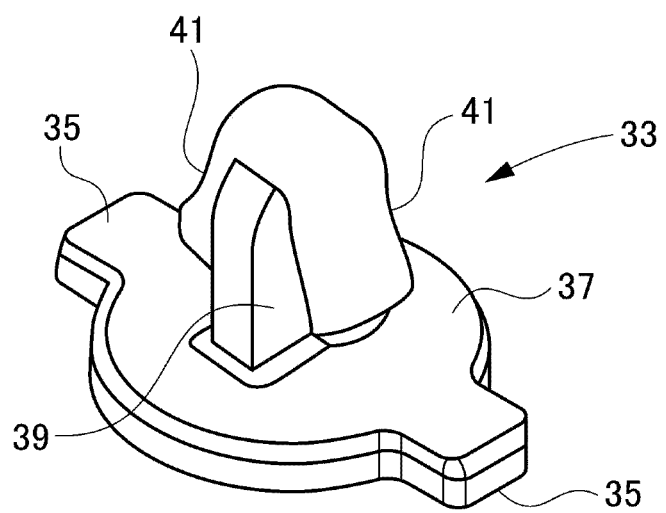
FIG. 4 is a perspective view of the clamp shown in FIG. 2.

FIG. 4 is a perspective view of the clamp 33 shown in FIG. 2.

The clamp 33 has a circular sealing surface pressure generating part 37 which has convex parts 35 at two sides in the diameter direction. A shaft 39 is raised from one surface of the sealing surface pressure generating part 37, and a pair of elastic locking pawls 41 is formed at the distal end of the shaft 39. The shaft 39 and the elastic locking pawls 41 of the clamp 33 are inserted through the sheet hole 31 of the second one-sided self-adhesive sheet material 29. Therefore, the sealing surface pressure generating part 37 is held by being sandwiched between the second one-sided self-adhesive sheet material 29 and the wire harness 13.

In the present embodiment, the sealing surface pressure generating part 37 has a circular shape having the convex parts 35, but the sealing surface pressure generating part 37 is not limited to the circular shape. As long as sealing property is secured, various kinds of shapes can be adopted. The convex parts 35 may be omitted, but the area of the sealing surface pressure generating part 37 is substantially increased due to the convex parts 35 so that the retention of the clamp 33 to the one-sided self-adhesive sheets 17 can be increased.

The clamp 33 can be attached in different manners. For example, as shown in FIGS. 2 and 3, the clamp 33 is can be attached while the wire harness 13 and the clamps 33 are laminated vertically. The part I and the part II shown in FIG. 1 are equivalent to this kind of attaching parts.

Further, the clamp 33 may be attached by moving (offsetting) the position of the sheet hole 31 from a position X where the wire harness 13 is wired, and setting the clamp 33 horizontally beside the wire harness 13. In this case, the sealing surface pressure generating part 37 of the clamp 33 is directly sandwiched between the first one-sided self-adhesive sheet material 27 and the second one-sided self-adhesive sheet material 29. Because the clamp 33 is offset (a spacing distance as shown with Δt in FIG. 1) from the position X where the wire harness 13 is wired, the height of the clamp 33 and the height of the wire harness 13 are not accumulated, and the attaching height of the wire harness 13 from the attached body 43 is kept low. The part III and the part IV shown in FIG. 1 are equivalent to this kind of attaching parts.

The shaft 39 of the clamp 33 which is inserted through the sheet hole 31 may be smaller in diameter than the sheet hole 31 to make it possible to adjust the pitch. In this case, as shown in FIGS. 2 and 3, since a gap 38 occurs between the sheet hole 31 and the shaft 39, the clamp 33 may move relative to the sheet hole 31, and a fine adjustment of the clamp pitch P1 (refer to FIG. 14) becomes possible. The sheet hole 31 may become a long hole which is long in a direction the pitch is adjusted. However, the basic positions of the sheet holes 31 are integrally determined by a forging process or the like when the second one-sided self-adhesive sheet material 29 is formed. Thereby, in comparison that the clamps 33 are attached by manual operations traditionally, the clamp positions are determined with an extremely high precision.

In this way, the wire harness 13 of the clamp-attached wire harness 11 is packaged by the one-sided self-adhesive sheets 17 which hold a plurality of the clamps 33 at predetermined pitches in accordance with the positions where the attached body 43 (refer to FIG. 5) such as the body or the door is attached.

Figure 5:
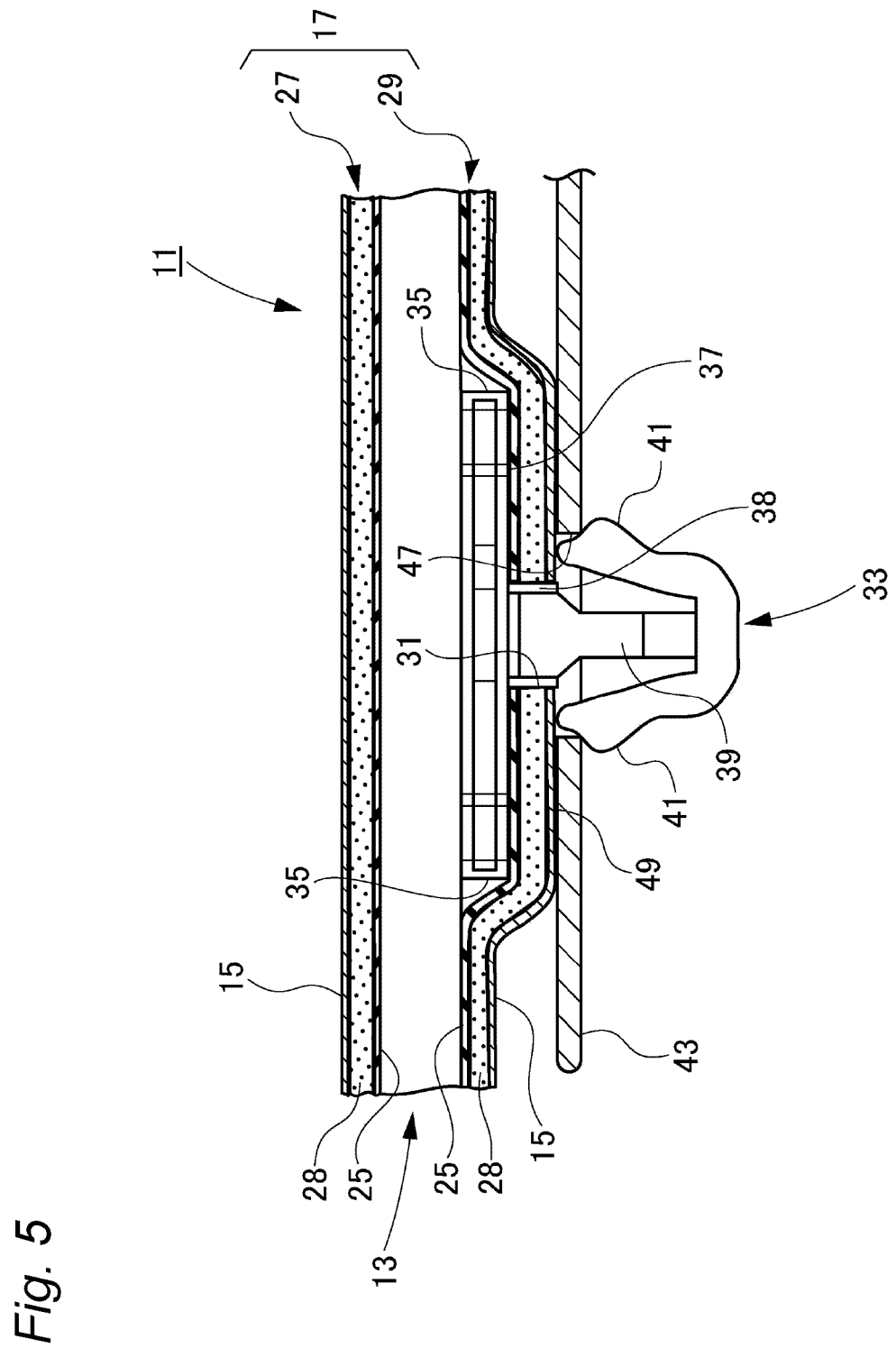
FIG. 5 is a sectional view of the clamp-attached wire harness which is attached to an attached body through a clamp.
Figure 6:
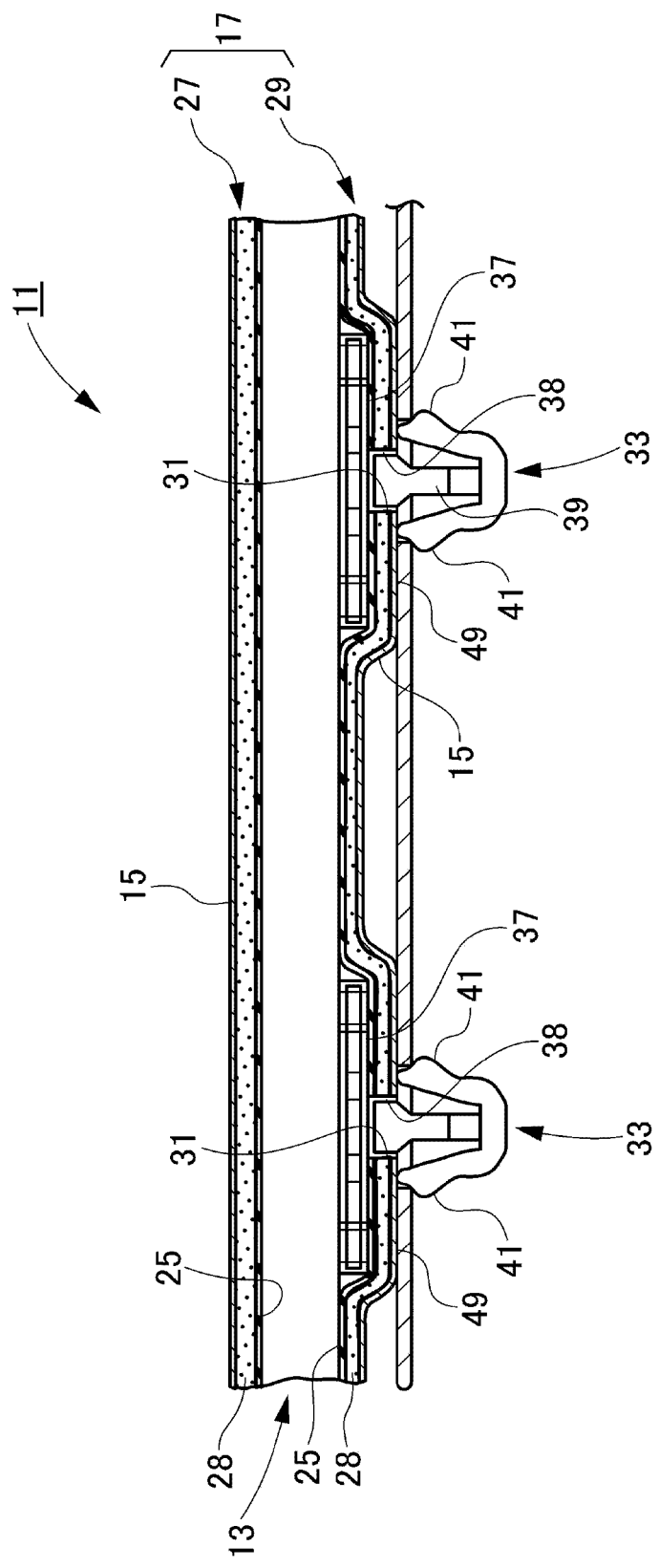
FIG. 6 is a sectional view of the clamp-attached wire harness which is provided with clamps in a plurality of positions.

FIG. 5 is a sectional view of the clamp-attached wire harness 11 which is attached to the attached body 43 through a clamp 33. FIG. 6 is a sectional view of the clamp-attached wire harness 11 which is provided with the clamps 33 in a plurality of positions.

In this embodiment, the surface materials 15 of the one-sided self-adhesive sheets 17 of the clamp-attached wire harness 11 have waterproofness. That is, the surface materials 15 are made of, for example, the above-mentioned PP or PET. The clamp 33 is formed with the above-mentioned sealing surface pressure generating part 37 which makes the surface material 15 of the one-sided adhesive sheet 17 come in close contact with the attached body 43 when the clamp 33 is attached to the attached body 43.

With the clamp-attached wire harness 11, when the clamp 33 is attached to a clamp hole 47 of the attached body 43, the sealing surface pressure generating part 37 of the clamp 33 presses the surface material 15 of the one-sided self-adhesive sheet 17 against the attached body 43. The sealing surface pressure generating part 37 applies a sealing pressure to the second one-sided self-adhesive sheet material 29 in a circular area around the shaft 39 of the clamps 33. Thereby, the contact surface with the attached body 43 gets large so that a sealing surface 49 is stable, and reliable waterproofness is ensured. Further, because a plurality of the clamps 33 are attached to one piece of the second one-sided self-adhesive sheet material 29 the surface material 15 of which has waterproofness, as shown in FIG. 6, packings of individual clamps at positions where waterproofness is necessary are not required so that the number of components can be reduced and the operation of attaching the packings can be omitted.

Figure 8:
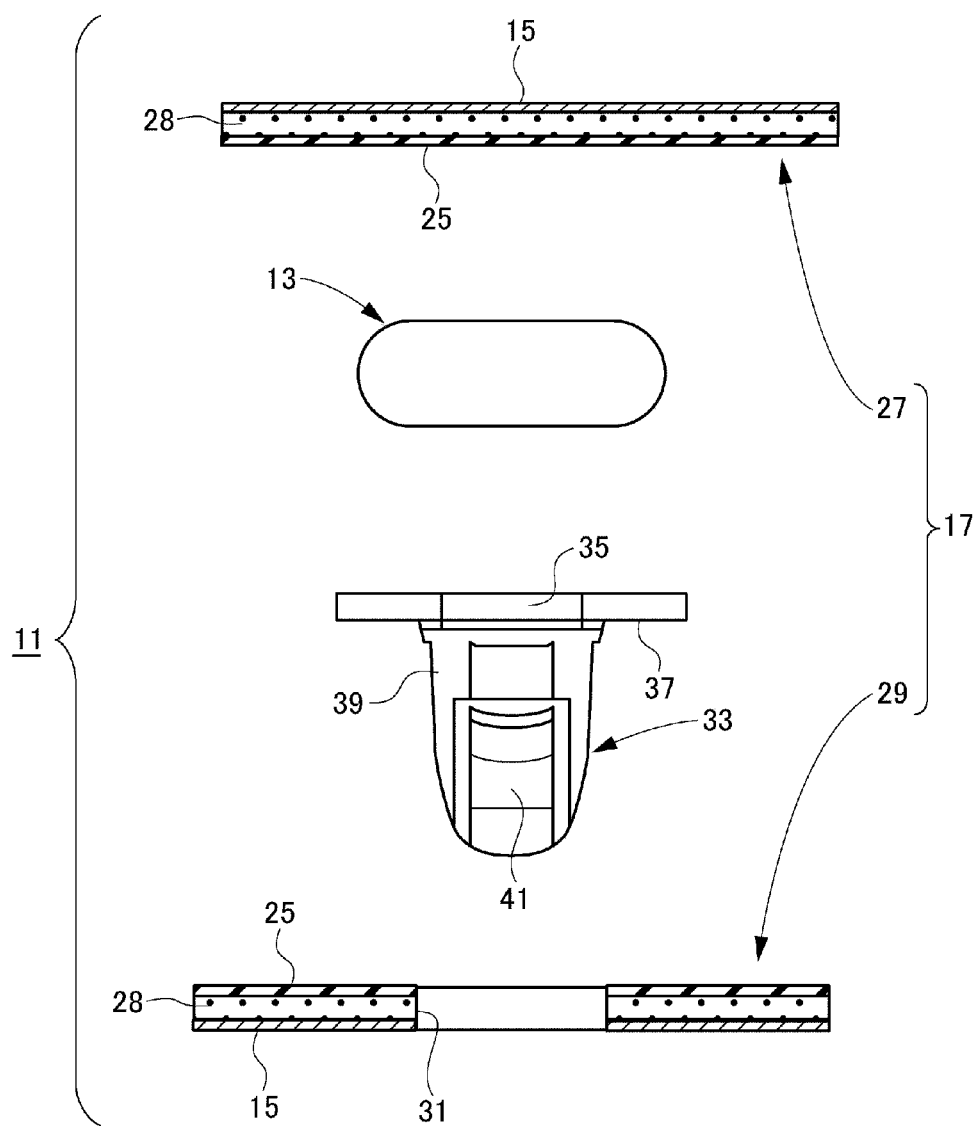
FIG. 8 is an exploded sectional view around a clamp in a direction perpendicular to the wire harness in the part I shown in FIG. 1.

Next, a method of assembling the above-mentioned clamp-attached wire harness 11 is described with reference to FIGS. 7 and 8.

FIG. 7 is an exploded view of the clamp-attached wire harness 11 shown in FIG. 1. FIG. 8 is an exploded sectional view around the clamp 33 in a direction perpendicular to the wire harness 13 in the part I shown in FIG. 1.

To assemble the clamp-attached wire harness 11, first, the second one-sided self-adhesive sheet material 29 is laid on an operation bench or the like. The special adhesive layer 25 of the second one-sided self-adhesive sheet material 29 faces upwards. The wire harness 13 which is wired in a predetermined wiring pattern (in the present embodiment, a wiring pattern in accordance with the wiring course of the door 501) in advance is based on the second one-sided self-adhesive sheet material 29, and put on the second one-sided self-adhesive sheet material 29. Although the clamps 33 are inserted through the sheet holes 31 of the second one-sided self-adhesive sheet material 29 in advance, the clamps 33 may be attached by being inserted through the sheet holes 31 while the wire harness 13 is placed.

After the wire harness 13 is placed, the wire harness 13 is covered with the first one-sided self-adhesive sheet material 27 from above. The special adhesive layer 25 of the first one-sided self-adhesive sheet material 27 faces downwards. In a state that the wire harness 13 and the sealing surface pressure generating part 37 of the clamp 33 are sandwiched, the first one-sided self-adhesive sheet material 27 and the second one-sided self-adhesive sheet material 29 are crimped. Thereby, a plurality of the clamps 33 are attached at the predetermined pitches, and the clamp-attached wire harness 11 whose wire harness 13 is sandwiched and held by the one-sided self-adhesive sheets 17 is completed at the same time (refer to FIG. 1).

Next, the operation and effect of the clamp-attached wire harness 11 having the above construction is described.

In the clamp-attached wire harness 11 according to the above first embodiment, only by packaging the wire harness 13 that is wired in the predetermined wiring pattern in accordance with the wiring course of the door 501 with the one-sided adhesive sheets 17 to hold the wire harness 13, the wiring pattern such as a bent portion 13A, a branched portion 13B and a straight portion 13C of electric wires is kept (refer to FIG. 7). Thus, when the harness is to be attached, the wire harness 11 can be attached easily in accordance with the wiring courses of the door 501.

Furthermore, by molding the external shape of the one-sided self-adhesive sheets 17 in advance in accordance with the wiring course shape of the wire harness 13, the attaching reference parts of the wire harness 13 such as the bent portion 13A and the branched portion 13B of the electric wires, those parts (the part III and part IV) that project to make the positions of sheet holes 57 to which the clamps 33 are attached offset from the wiring position of the wire harness 13, and the clamp attaching position which can be easily seen since the plurality of clamps 33 project from one surface of the one-sided self-adhesive sheet 17 can be recognized from the appearance of the clamp-attached wire harness 11 covered with the one-sided self-adhesive sheets 17. Thus, it becomes easy to position the attaching reference parts of the clamp-attached wire harness 11 relative to fixing sites of the wiring course in the door 501 when the harness is attached, and the attaching operativity is further improved.

By reducing the extra parts of the one-sided adhesive sheets 17, while the wire harness 11 becomes lightweight, the wiring space can be compact.

In the clamp-attached wire harness 11, because the sheet holes 31 for holding the clamps 33 are opened at the one-sided self-adhesive sheets 17 in advance by a forging process or the like, in comparison that the clamps are attached by hands at present, a high pitch precision is obtained. Because the wire harness 13 is packaged with the one-sided adhesive sheets 17 which can hold the clamps 33, a plurality of components (binding tapes, soundproofing sheets, clamp attaching tapes, etc.) attached under the present conditions are integrated, most of the components which were necessary for assembling are reduced, and assembling operations on jigs are largely reduced.

Because the one-sided self-adhesive sheets 17 also function as packings, it is not necessary to attach a packing to each of the clamps 33. In addition, because the packing provided to the individual clamp 33 is integrated with the one-sided self-adhesive sheets 17, the waterproofing sealing surface is increased, the displacement, roll or deformation of the packings disappear, and the waterproofness is also improved significantly.

Therefore, according to the clamp-attached wire harness 11 of the present embodiment, while the pitch precision with which the clamps 33 are attached to the wire harness 13 can be improved, the man hours taken to assemble the wire harness 13 can be reduced, and without the packings, the waterproofness can be improved.

Although a construction is described that two materials, namely, the first one-sided self-adhesive sheet material 27 and the second one-sided self-adhesive sheet material 29 are used in the one-sided self-adhesive sheets 17, as shown in FIG. 7, the one-sided adhesive sheet according to the present invention is not limited to this. As long as the wire harness is packaged with one-sided adhesive sheets, various kinds of shapes can be adopted.

Figure 9:
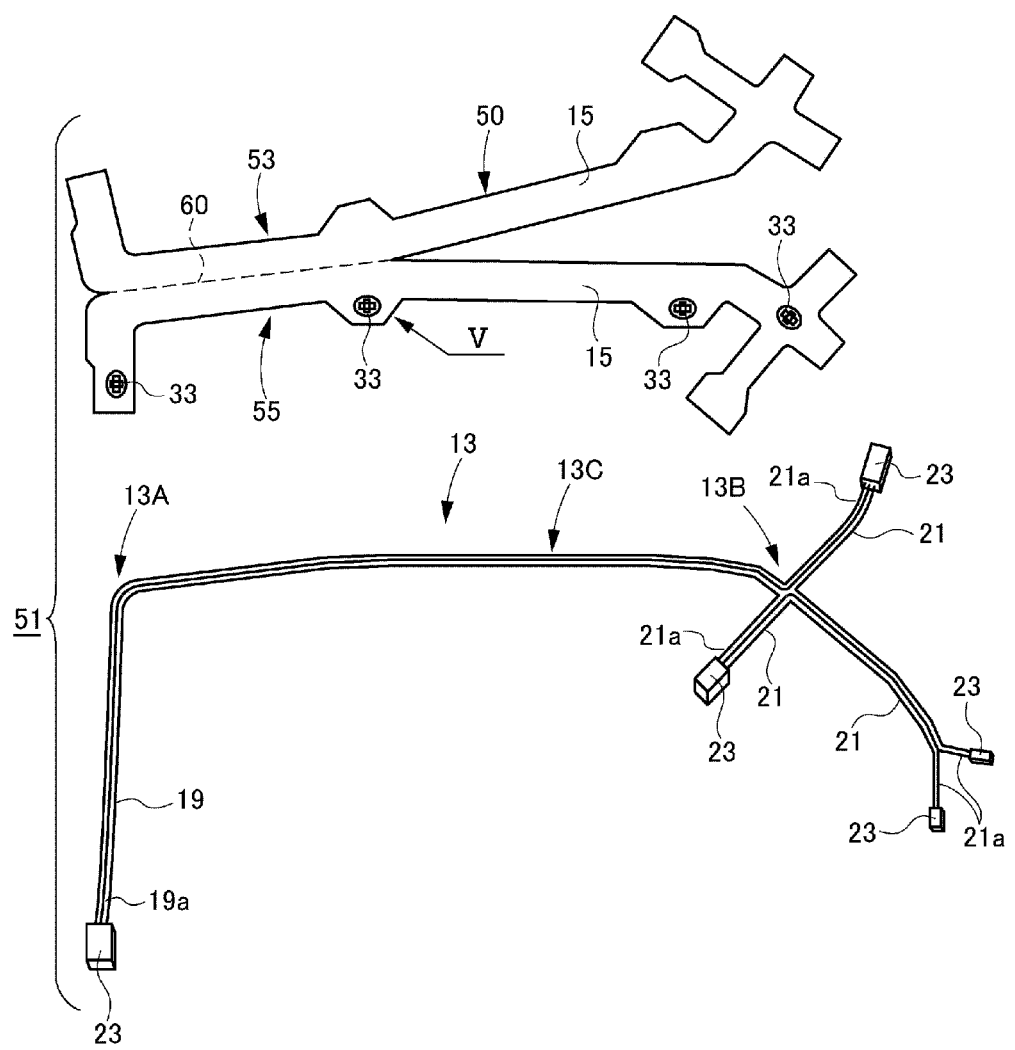
FIG. 9 is an exploded view of a clamp-attached wire harness according to a second embodiment of the present invention.
Figure 10:
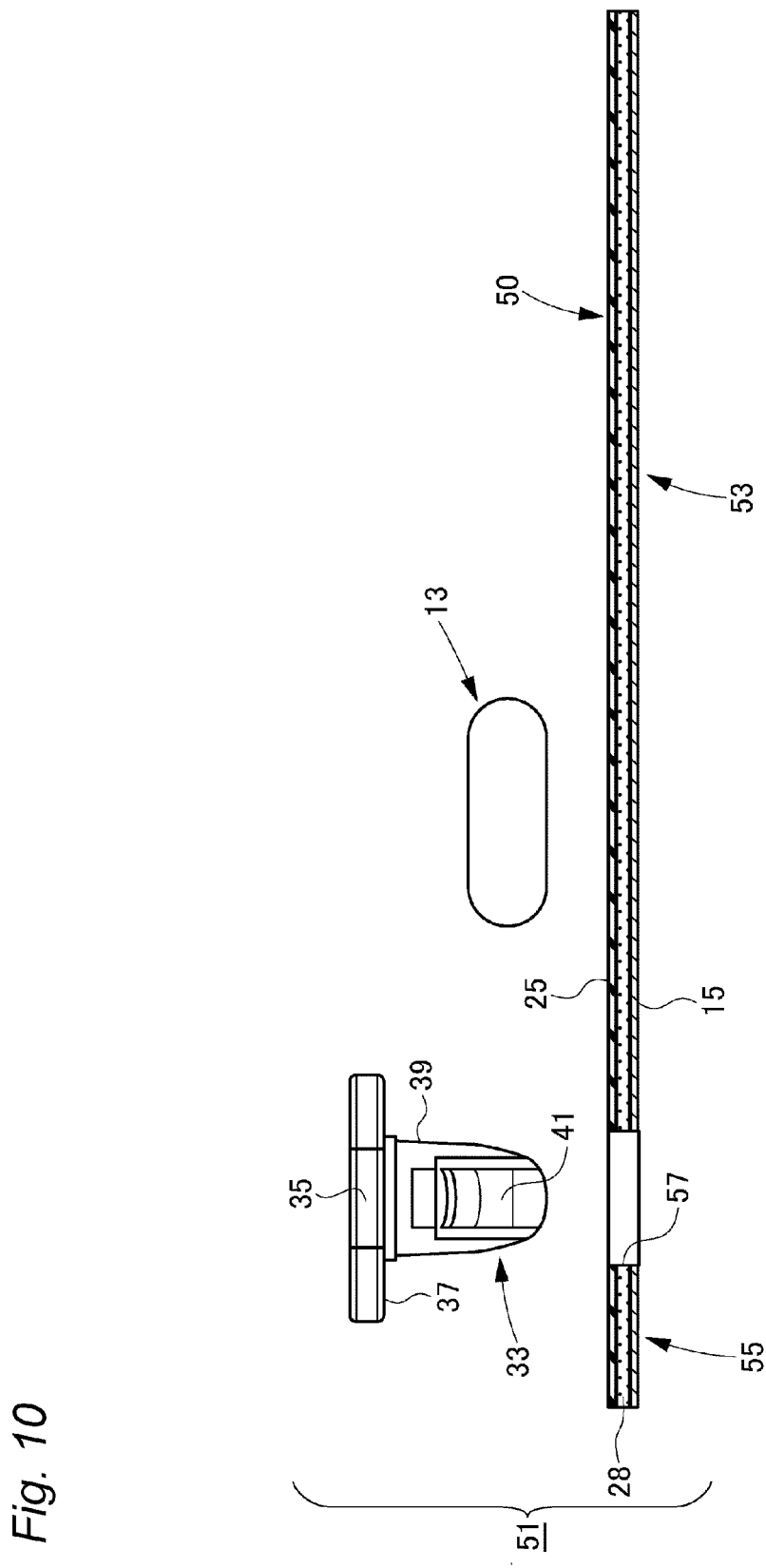
FIG. 10 is an exploded sectional view around a clamp in a direction perpendicular to the wire harness in the part V shown in FIG. 9.
Figure 11:
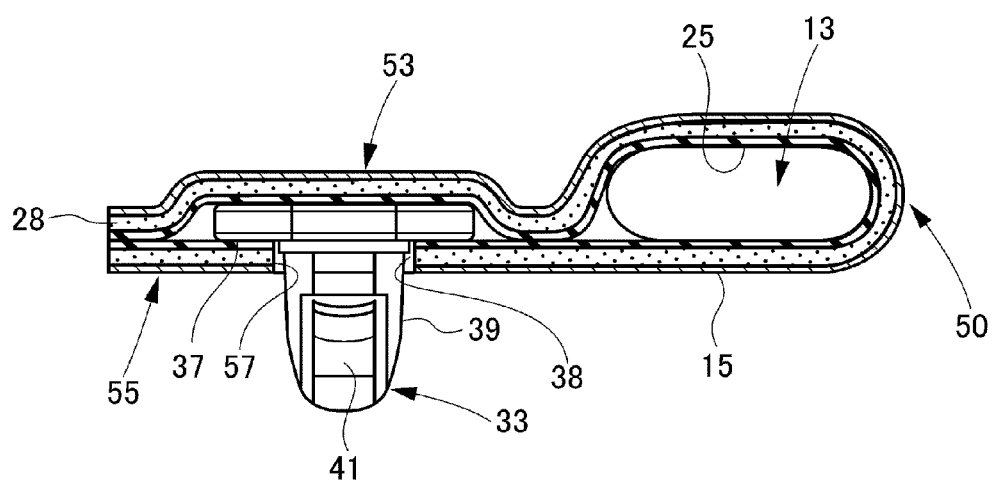
FIG. 11 is a sectional view of the clamp-attached wire harness in which the wire harness is sandwiched and held by a one-sided self-adhesive sheet near the clamp shown in FIG. 10.

FIG. 9 is an exploded view of a clamp-attached wire harness 51 according to the second embodiment of the present invention. FIG. 10 is an exploded sectional view around the clamp 33 in a direction perpendicular to the wire harness 13 in the part V shown in FIG. 9. FIG. 11 is a sectional view of the clamp-attached wire harness 51 in which the wire harness 13 is sandwiched and held by an one-sided self-adhesive sheet 50 near the clamp 33 shown in FIG. 10. Furthermore, the same component members as those of the clamp-attached wire harness 11 of the above-mentioned first embodiment are given the same numbers, and their detailed description is omitted.

In the clamp-attached wire harness 51 shown in FIGS. 9 to 11, the wire harness 13 is packaged by the one-sided self-adhesive sheet 50.

The one-sided self-adhesive sheet 50 used in this second embodiment, as shown in FIG. 9, is a piece of sheet in which a first one-sided self-adhesive sheet material 53 and a second one-sided self-adhesive sheet material 55 are integrated, and whose external shape is formed in advance to match the wiring course shape of the wire harness 13 when the one-sided self-adhesive sheet 50 is folded along a fold part 60. As shown in FIG. 10, sheet holes 57 are bored at predetermined positions of the second one-sided self-adhesive sheet material 55, and the clamps 33 are inserted through the sheet holes 57. The one-sided self-adhesive sheet 50 after the clamps 33 are inserted through the sheet holes 57 constructs a clamp-sheet assembly.

To assemble the clamp-attached wire harness 51, first, the one-sided self-adhesive sheet 50 is laid on an operation bench or the like with the special adhesive layer 25 upwards. The wire harness 13 which is wired in a predetermined wiring pattern in advance is based on the second one-sided self-adhesive sheet material 55 in the one-sided self-adhesive sheet 50, and put on the second one-sided self-adhesive sheet material 55.

After the wire harness 13 is placed, the wire harness 13 is covered with the first one-sided self-adhesive sheet material 53 which is folded along the fold part 60 from above.

As shown in FIG. 11, in a state that the wire harness 13 and the sealing surface pressure generating part 37 of the clamp 33 are sandwiched, the special adhesive layer 25 of the first one-sided self-adhesive sheet material 53 and the special adhesive layer 25 of the second one-sided self-adhesive sheet material 55 are contacted and crimped with each other. Thereby, a plurality of the clamps 33 are attached at the predetermined pitches, and the clamp-attached wire harness 51 whose wire harness 13 is sandwiched and held by the one-sided self-adhesive sheet 50 is completed at the same time.

In the part V shown in FIG. 9, because the position of the sheet hole 57 which is bored through the one-sided self-adhesive sheet 50 is offset from the position where the wire harness 13 is wired, the height of the clamp 33 which is set aside and the height of the wire harness 13 are not accumulated, and the attaching height of the wire harness 13 from the attached body 43 is kept low (refer to FIG. 11).

Therefore, for the clamp-attached wire harness 51 of the present second embodiment, like the clamp-attached wire harness 11 of the above first embodiment, while the pitch precision with which the clamps 33 are attached to the wire harness 13 can be improved, the man hours taken to assemble the wire harness 13 can be reduced, and without the packings, the waterproofness can be improved.

Although the constructions are described that in the clamp-attached wire harnesses 11 or 51 of the above embodiments, almost the whole of the wire harness 13 is packaged by the one-sided self-adhesive sheets 17 or 50 to maintain the wiring pattern of the wire harness 13, the wire harness according to the present invention is not limited to these, and the wire harness 13 may be partially packaged by one-sided adhesive sheets.

Figure 12:
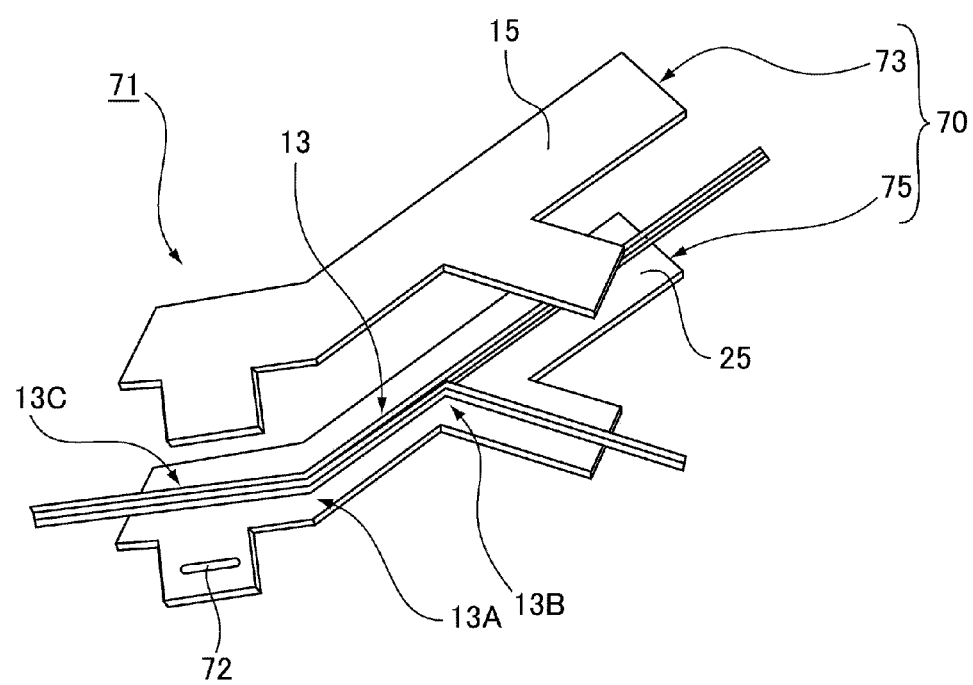
FIG. 12 is an exploded perspective view of a clamp-attached wire harness according to a third embodiment of the present invention.
Figure 13:
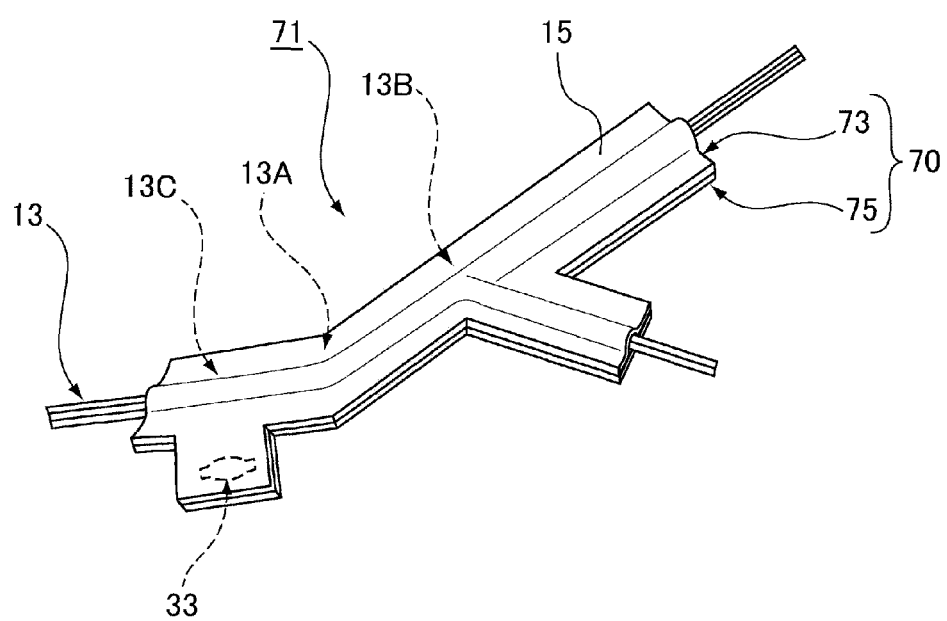
FIG. 13 is a perspective view after the clamp-attached wire harness shown in FIG. 12 is assembled.

FIG. 12 is an exploded view of a clamp-attached wire harness 71 according to the third embodiment of the present invention. FIG. 13 is a perspective view after the clamp-attached wire harness 71 shown in FIG. 12 is assembled. Furthermore, the same component members as those of the clamp-attached wire harness 11 of the above-mentioned first embodiment are given the same numbers, and their detailed description is omitted.

In the clamp-attached wire harness 71 shown in FIGS. 12 and 13, part of the wire harness 13 is packaged by one-sided self-adhesive sheets 70.

The one-sided self-adhesive sheets 70 used in the fourth embodiment include a first one-sided self-adhesive sheet material 73 and a second one-sided self-adhesive sheet material 75 (refer to FIG. 12). The first one-sided self-adhesive sheet material 73 is a sheet in which a surface material 15 and a special adhesive layer 25 are laminated on the outside and inside surfaces of a sheet base material 28, and whose external shape is formed in accordance with parts of the wiring course shape corresponding to a bent portion 13A, a branched portion 13B and a straight portion 13C of the electric wires in the wire harness 13 of FIG. 12. The second one-sided self-adhesive sheet material 75, like the first one-sided self-adhesive sheet material 73, is a sheet in which a surface material 15 and a special adhesive layer 25 are laminated on the outside and inside surfaces of a sheet base material 28, and is formed into such a shape that the adhesive surface (inside surface) matches that of the first one-sided self-adhesive sheet material 73. A sheet hole 72 is bored at a predetermined position (a position with a predetermined distance from the straight portion 13C) of the second one-sided self-adhesive sheet material 75. The clamp 33 is inserted through the sheet hole 72. The second one-sided self-adhesive sheet material 75 after the clamp 33 is inserted through the sheet hole 72 constructs a clamp-sheet assembly.

To assemble the clamp-attached wire harness 71, first, the second one-sided self-adhesive sheet material 75 is laid on an operation bench or the like with the special adhesive layer 25 upwards. The bent portion 13A, the branched portion 13B and the straight portion 13C of the electric wires in the wire harness 13 which is wired in a predetermined wiring pattern in advance are based on the second one-sided self-adhesive sheet material 75, and put on the second one-sided self-adhesive sheet material 75.

After the wire harness 13 is placed, the wire harness 13 is covered with the first one-sided self-adhesive sheet material 73 from above. The special adhesive layer 25 of the first one-sided self-adhesive sheet material 73 faces downwards. In a state that the wire harness 13 and the sealing surface pressure generating part 37 of the clamp 33 are sandwiched, the first one-sided self-adhesive sheet material 73 and the second one-sided self-adhesive sheet material 75 are crimped.

Thereby, as shown in FIG. 13, the clamp 33 is attached, and the clamp-attached wire harness 71 whose wire harness 13 is sandwiched and held by the one-sided self-adhesive sheets 70 is completed at the same time.

Therefore, because the external shape of the clamp-attached wire harness 71 of the third embodiment, which corresponds to the bent portion 13A, the branched portion 13B and the sheet hole 72 that become the attaching reference parts relative to a plurality of fixing sites of the attached body 43 when the harness is attached, is formed at the one-sided adhesive sheets 70 in advance by a forging process or the like, a high interval precision between the attaching reference parts is obtained.

In this way, in the clamp-attached wire harness 71 of the third embodiment, since parts of the wire harness 13 including at least any two portions such as the bent portion 13A and the branched portion 13B that become the attaching reference parts relative to the plurality of fixing sites of the attached body 43 are packaged with the one-sided self-adhesive sheets 70, like the clamp-attached wire harness 11 of the above first embodiment, it becomes easy to position the attaching reference parts relative to the plurality of fixing sites of the wiring course of the attached body 43 when the harness is attached, and the attaching operativity is improved.

Although the construction is described that in the clamp-attached wire harness 71 of the above third embodiment, the wire harness 13 is partially packaged with the one-sided self-adhesive sheets 70, the wire harness 13 may be packaged by one-sided adhesive sheets.

Figure 14:
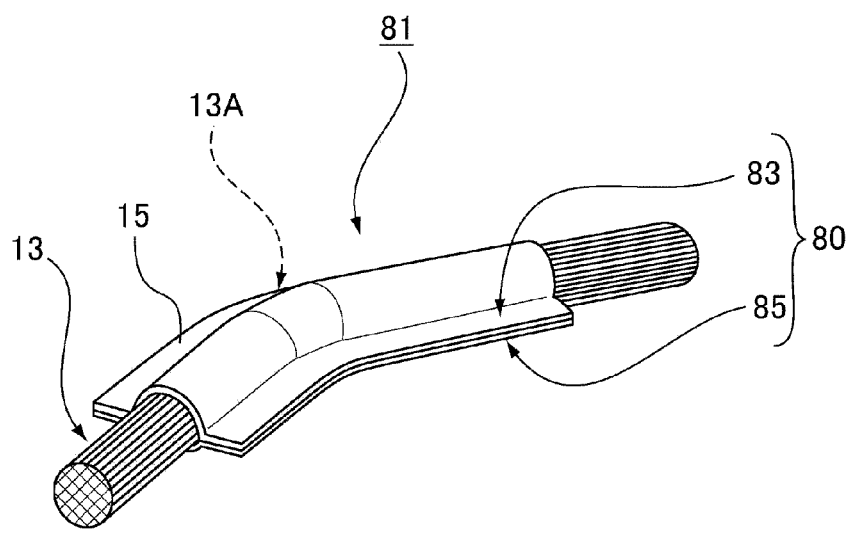
FIG. 14 is a perspective view of main parts of a wire harness according to a fourth embodiment of the present invention.

FIG. 14 is a perspective view of main parts of a wire harness 81 according to the fourth embodiment of the present invention.

In the wire harness 81 shown in FIG. 14, only an area around a bent portion 13A of electric wires in the wire harness 13 is packaged by one-sided self-adhesive sheets 80. The one-sided self-adhesive sheets 80 used in the fourth embodiment include a first one-sided self-adhesive sheet material 83 and a second one-sided self-adhesive sheet material 85.

The first one-sided self-adhesive sheet material 83 is a sheet in which a surface material 15 and a special adhesive layer 25 are laminated on the outside and inside surfaces of a sheet base material 28, and whose external shape is formed in accordance with a part of the wiring course shape corresponding to the bent portion 13A of the electric wires in the wire harness 13. The second one-sided self-adhesive sheet material 85, like the first one-sided self-adhesive sheet material 83, is a sheet in which a surface material 15 and a special adhesive layer 25 are laminated on the outside and inside surfaces of a sheet base material 28, and is formed into such a shape that the adhesive surface (inside surface) matches that of the first one-sided self-adhesive sheet material 83.

In this way, in the wire harness 81 of the fourth embodiment, since a part of the wire harness 13 at least including the bent portion 13A that becomes an attaching reference part relative to the fixing site of the attached body 43 is packaged with the one-sided self-adhesive sheets 80, it becomes easy to position the attaching reference part relative to the fixing site of the wiring course of the attached body 43 when the harness is attached, and the attaching operativity is improved.

The attaching reference part relative to the fixing site of the attached body 43 is not limited to the bent portion 13A of the wire harness 13, the one-sided self-adhesive sheets 80 which are formed in accordance with a part of the wire harness 13 at least including a branched portion 13B may package the wire harness 13, and the clamps 33 may be provided.

Further, the wire harness can be so constructed that a straight portion of the wire harness is partially packaged by long one-sided adhesive sheets, and a plurality of the clamps 33 are attached along the longitudinal direction of the one-sided adhesive sheets at a predetermined pitch.

The wire harness of the present invention is described above in detail with reference to the specific embodiments, but the invention is not limited to the previously described embodiments, and besides, it is apparent that various modifications to the present invention can be made without changing the purpose of the present invention.

According to the wire harness of the present invention, it can be easy to attach the wire harness to a plurality of fixing sites of an attached body when the wire harness is attached to a vehicle. Further, while the pitch precision with which the clamps are attached to the wire harness can be improved, the man hours taken to assemble the wire harness can be reduced.

What is claimed is:

1. A wire harness assembly comprising:
   a wire harness configured for wiring in a predetermined wiring pattern with respect to an attached body; and
   a first pre-formed one-sided adhesive sheet and a second pre-formed one-sided adhesive sheet, each of the first and second pre-formed one-sided adhesive sheets having a first side and a second side opposite to the first side, the first side comprising a laminated adhesive and the second side being non-adhesive, wherein at least the first one-sided adhesive sheet is formed into an external shape that fits a wiring course shape of the wire harness with respect to the attached body, the first one-sided adhesive sheet maintaining the wiring course shape without being attached to the wire harness,
   wherein the first one-sided adhesive sheet holds a clamp in a sheet hole which is formed in the first one-sided adhesive sheet, with a shaft of the clamp extending through the sheet hole and with a contact part of the clamp contacting the first side of the second one-sided adhesive sheet, the sheet hole being offset from a position of the wire harness in a direction parallel to the first side of the first one-sided adhesive sheet, and
   wherein the wire harness is packaged by contacting and being held between the first side of the first one-sided adhesive sheet and the first side of the second one-sided adhesive sheet to maintain the predetermined wiring pattern, wherein a portion of the first side of the first one-sided adhesive sheet is adhered to a portion of the first side of the second one-sided adhesive sheet.

2. The wire harness assembly according to claim 1, wherein:
   the external shape corresponds to at least any two of bent portions and branched portions of an electric wire, and the at least any two of the bent portions and the branched portions are spaced apart with a predetermined distance in accordance with positions where the attached body is to be attached.

3. The wire harness assembly according to claim 1, wherein:
   the sheet hole is formed in the first one-sided adhesive sheet with a predetermined distance from bent or branched portions of an electric wire in accordance with one or more positions where the attached body is to be attached, and wherein the contact part of the clamp further contacts the first side of the first one-sided adhesive sheet, with the laminated adhesive disposed between the contact part of the clamp and the first side of the first one-sided adhesive sheet.

4. The wire harness assembly according to claim 3, wherein:

a surface material of the second side of the first one-sided adhesive sheet is waterproof.

5. The wire harness assembly according to claim 3, wherein: the clamp is formed with a sealing surface pressure generating part configured to cause the first one-sided adhesive sheet to come into close contact with the attached body when the clamp is attached to the attached body.

6. The wire harness assembly according to claim 1, wherein the first one-sided adhesive sheet holds clamps in a plurality of sheet holes which are formed at a predetermined pitch in accordance with positions where the attached body is attached.

7. The wire harness assembly according to claim 6, wherein positions of the sheet holes which are formed in the first one-sided adhesive sheet and through which the clamps are inserted are offset from positions of the wire harness in a direction parallel to the first side of the first one-sided adhesive sheet.

8. The wire harness assembly according to claim 6, wherein: each of the clamps is formed with a sealing surface pressure generating part configured to cause the first one-sided adhesive sheet to come into close contact with the attached body when the clamps are attached to the attached body.

9. The wire harness assembly according to claim 1, wherein:

a surface material of the second side of the first one-sided adhesive sheet is waterproof.

10. The wire harness assembly according to claim 1, wherein the clamp has a shaft which is inserted through the sheet hole, and a diameter of the shaft is smaller than a diameter of the sheet hole.

11. The wire harness assembly according to claim 1, wherein: the clamp is formed with a sealing surface pressure generating part configured to cause the first one-sided adhesive sheet to come into close contact with the attached body when the clamp is attached to the attached body.

12. The wire harness according to claim 1, wherein:

the first side of the first one-sided adhesive sheet can be bonded only by contacting a surface having a same type of adhesive as the laminated adhesive.

13. The wire harness assembly according to claim 1, wherein a portion of the first one-sided adhesive sheet and a portion of the second one-sided adhesive sheet are disposed between the clamp and the wire harness in the direction parallel to the first side of the firs one-sided adhesive sheet, and wherein the portion of the first one-sided adhesive sheet and the portion of the second one-sided adhesive sheet are adhered to each other.

* * * * *